Patented May 16, 1933

1,908,862

UNITED STATES PATENT OFFICE

CHARLES H. REESE, OF ERIE, PENNSYLVANIA, ASSIGNOR TO HAMMERMILL PAPER COMPANY, OF ERIE, PENNSYLVANIA, A CORPORATION OF PENNSYLVANIA

METHOD OF RECLAIMING WASTE SULPHITE LIQUOR

No Drawing. Application filed August 7, 1929. Serial No. 384,243.

The present invention relates to paper making processes and has for an object to provide an improved method of preparing for use the waste liquor of the sulphite process.

The cooking liquor used in the sulphite paper making process dissolves from the wood chips treated a considerable quantity of the natural binder of the wood with the result that an effective binder for use in the making of coal briquets and as a core binder in foundries can be produced by reclaiming this material. The present invention provides an improved method of concentrating the waste liquor containing this binder material for the purpose of producing a binder of this type.

In its original condition as drawn from the digester the waste cooking liquor is acid and before evaporating for the purpose of concentrating it is desirable to neutralize the acid as with lime and to separate the precipitate. Ordinarily the precipitate formed by the addition of the lime settles very slowly and incompletely. In accordance with the present invention lime is added in a quantity sufficient to neutralize the acid and precipitation is hastened by adding after the lime treatment a coagulant such as gelatine or glue. The addition of this coagulant produces a compact precipitate which settles quickly and leaves a clear liquid that can be readily separated and evaporated. The precipitate not only settles quickly but is more compact and therefore there is less loss of liquor.

The coagulation and settling of the precipitate may be hastened by heat and preferably the operation is carried on at a temperature of approximately 200° F. The clear liquid when separated from the precipitate is concentrated by evaporation until a concentration of about 50% solid matter is reached and this product forms an effective binding material for use in making briquets and as a core binder in foundries.

The foregoing particular description is illustrative merely and is not intended as defining the limits of the invention.

I claim:
1. The method of preparing for use the waste liquor of the sulphite process of paper making which comprises adding lime to the liquor to neutralize the acid thereof, adding a gelatinous material to coagulate the precipitate, heating the liquor to approximately 200 degrees F., and separating the liquor from the precipitate to produce a clear liquor for subsequent use.

2. The method of preparing for use the waste liquor of the sulphite process of paper making which comprises adding lime to the liquor to neutralize the acid thereof, adding a gelatinous material to coagulate the precipitate, heating the liquor to approximately 200 degrees F., separating the liquor from the precipitate to produce a clear liquor, and evaporating the clear liquor to concentrate the same.

In testimony whereof, I have signed my name to this specification this 27th day of June 1929.

CHARLES H. REESE.